United States Patent
Tanabe et al.

(10) Patent No.: US 6,457,453 B1
(45) Date of Patent: Oct. 1, 2002

(54) ACCUMULATOR FUEL-INJECTION APPARATUS

(75) Inventors: Keiki Tanabe; Susumu Kohketsu; Seijiro Kotooka, all of Tokyo (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/980,214

(22) PCT Filed: Mar. 31, 2000

(86) PCT No.: PCT/JP00/02108
§ 371 (c)(1),
(2), (4) Date: Nov. 30, 2001

(87) PCT Pub. No.: WO01/75297
PCT Pub. Date: Oct. 11, 2001

(51) Int. Cl.[7] ............................. F02B 3/00; F02M 7/00
(52) U.S. Cl. ..................... 123/300; 123/447; 123/496
(58) Field of Search ........................ 123/300, 299, 123/496, 447, 446, 456

(56) References Cited

U.S. PATENT DOCUMENTS

| | | | | |
|---|---|---|---|---|
| 5,622,152 A | * | 4/1997 | Ishida | 123/446 |
| 5,771,865 A | | 6/1998 | Ishida | |
| 6,047,682 A | * | 4/2000 | Fujino et al. | 123/458 |
| 6,073,608 A | * | 6/2000 | Krieger et al. | 123/299 |
| 6,092,509 A | * | 7/2000 | Tanabe et al. | 123/447 |
| 6,112,721 A | | 9/2000 | Kouketsu | |
| 6,189,509 B1 | * | 2/2001 | Froment | 123/467 |
| 6,192,862 B1 | * | 2/2001 | Tanabe et al. | 123/447 |

FOREIGN PATENT DOCUMENTS

| | | |
|---|---|---|
| DE | 19704663 A1 | 8/1997 |
| DE | 19809001 A1 | 9/1998 |
| JP | 5-195903 A | 8/1993 |
| JP | 6-093936 A | 4/1994 |
| JP | 7-139448 A | 5/1995 |
| JP | 10-037790 A | 2/1998 |
| WO | 98/09068 A1 | 3/1988 |

* cited by examiner

Primary Examiner—Carl S. Miller

(57) ABSTRACT

A controller (8) of an accumulator fuel-injection apparatus opens a selector valve (5) for injection rate switching for a short time between auxiliary injection and main injection, the selector valve controlling high-pressure fuel supply from a high-pressure accumulator (3) to a fuel passage (10a) on the downstream side of a check valve (32), whereby a fuel pressure higher than an auxiliary injection pressure and lower than a main injection pressure is formed in the fuel passage on the downstream side of the selector valve (5). By opening, in this state, an on-off valve (7) for injection timing control to start the main injection, a proper pressure higher than the auxiliary injection pressure and lower than the subsequent main injection pressure is established in the initial stage of main injection, improving fuel economy and exhaust-gas characteristic.

3 Claims, 7 Drawing Sheets

FLAMES

FLAMES

ACCUMULATOR FUEL-INJECTION APPARATUS

This application is the national phase under 35 U.S.C. §371 of PCT International Application No. PCT/JP00/02108 which has an International filing date of Mar. 31, 2000, which designated the United States of America.

TECHNICAL FIELD

The present invention relates to an accumulator fuel-injection apparatus.

BACKGROUND ART

An accumulator fuel-injection apparatus is known which stably supplies respective cylinders of a diesel engine with high-pressure fuel stored in an accumulator to improve engine performance in a broad operating region. Even with a fuel-injection apparatus of this type, an abrupt explosion combustion takes place in the initial stage of combustion, causing noisy engine operation and increased NOx in exhaust gas, if the fuel injection rate immediately after the start of fuel injection is too high or if the quantity of fuel injected in an ignition delay period is too large.

As a countermeasure against such a problem, auxiliary injection can be performed prior to main injection in each fuel injection cycle. This shortens the ignition delay period, realizing a reduction in an amount of fuel injected in the ignition delay period by the main injection, whereby the abrupt combustion is prevented to reduce the engine noise and the NOx emission. In case that the fuel-injection apparatus is configured to perform high-pressure injection from the beginning of the main injection following the auxiliary injection, however a satisfactory reduction in noise and NOx emission cannot be always achieved. To attain the ignition-delay reducing effect, a minimum required quantity of fuel should be injected in the auxiliary injection. In order to reduce the fuel injection quantity to the required minimum in the fuel-injection apparatus of a type performing the auxiliary injection at a relatively high injection pressure, the auxiliary injection period must be shortened. This requires high control accuracy. If the required control accuracy is not attained, the fuel injection quantity in the auxiliary injection becomes too small or too large, so that the intended effects of the auxiliary injection may not be achieved, resulting in degraded exhaust gas and fuel economy.

As another means of reducing engine noise and NOx emission, an accumulator fuel-injection apparatus has been proposed that injects fuel at a lower fuel injection rate in the initial stage of fuel injection in each fuel injection cycle. Byway of example, the proposed apparatus has a low-pressure accumulator for storing low-pressure fuel, a high-pressure accumulator for storing high-pressure fuel, a selector valve for selectively communicating the low- or high-pressure accumulator with an injector (fuel injection nozzle) to switch injection rate, and an on-off valve for permitting/preventing communication between a control chamber of the injector and a fuel tank to control injection start/end timings.

An accumulator fuel-injection apparatus of this kind, such as for example an apparatus disclosed in International Publication No. WO98/09068, is designed to control opening/closing timings of an on-off valve for injection timing control and of a selector valve for injection rate switching, so as to carry out only main injection or both main injection and auxiliary injection in each fuel-injection cycle. In addition, there is disclosed a technique of performing low-pressure injection in the initial stage of the main injection followed by high-pressure injection.

In connection with the present invention, the apparatus disclosed in the above publication can perform low-pressure auxiliary injection for a short time, and start main injection when a predetermined period of time has elapsed after completion of the auxiliary injection. Low-pressure injection is carried out in the initial stage of the main injection, and then high-pressure injection is carried out over the remaining period.

Specifically, by closing the on-off valve for injection timing control and the selector valve for injection rate switching, a fuel passage connecting the selector valve and a fuel chamber of the injector is filled with low-pressure fuel and a control chamber of the injector communicated with the fuel passage is supplied with the low-pressure fuel, whereby the injector is maintained in a valve-closing state. When the auxiliary-injection start timing is reached, the on-off valve is opened to discharge the fuel in the control chamber to the fuel tank, whereby the injector is opened to make low-pressure auxiliary injection, and the on-off valve is closed when the auxiliary injection period has elapsed. When a predetermined period of time has elapsed after completion of the auxiliary injection so that the main-injection start timing is reached, the on-off valve is opened again to start low-pressure main injection, and the selector valve is opened in the course of main injection so that high-pressure fuel supplied from the high-pressure accumulator is injected through the nozzle, thereby effecting high-pressure injection.

By conducting the low-pressure auxiliary injection and the main injection including low- and high-pressure injections in each fuel injection cycle as described above, the fuel economy and exhaust-gas characteristic of the engine can be improved. However, there is a demand for further improvement in fuel economy and exhaust-gas characteristic.

DISCLOSURE OF THE INVENTION

The object of the present invention is to provide an accumulator fuel-injection apparatus capable of establishing a proper injection pressure in the initial stage of main injection following low-pressure auxiliary injection, to thereby further improve fuel economy and exhaust-gas characteristic.

In order to attain the above object, an accumulator fuel-injection apparatus according to the present invention comprises a first accumulator for storing high-pressure fuel; a control valve for controlling discharge of the high-pressure fuel stored in the first accumulator toward a downstream-side of a fuel passage; a second accumulator, communicated with the fuel passage on the downstream of the control valve, for storing low-pressure fuel; and fuel control means for opening the control valve for a short time between auxiliary short injection and main injection, for opening the control valve in the course of the main injection, and then closing the control valve in conformity with completion of the main injection, while the auxiliary short injection and the main injection are carried out in this order with an interval through a fuel injection nozzle communicated with the fuel passage.

Desirably, the fuel control means establishes an intermediate pressure in the fuel passage on the downstream-side of the control valve in the initial stage of the main injection, the intermediate pressure being higher than the pressure of the low-pressure fuel in the second accumulator and lower than the pressure of the high-pressure fuel in the first accumulator.

With the accumulator fuel-injection apparatus of the present invention, when the control valve is opened for a short time after completion of the low-pressure auxiliary injection, the fuel passage is supplied with high-pressure fuel from the first accumulator for a short time, so that the fuel pressure in the fuel passage becomes higher than an auxiliary-injection pressure. In the initial stage of the main injection effected through the fuel injection nozzle, therefore, fuel is injected at a pressure higher than the auxiliary-injection pressure, desirably at an intermediate pressure higher than the auxiliary-injection pressure and lower than the pressure of the high-pressure fuel. When the control valve is opened in the course of the main injection, the high-pressure fuel is supplied through the fuel passage to the fuel injection nozzle, so that high-pressure injection is performed.

By injecting fuel in the initial stage of the main injection following the low-pressure auxiliary injection, at a pressure higher than the auxiliary-injection pressure, desirably at an intermediate pressure higher than the auxiliary-injection pressure and lower than the pressure of the high-pressure fuel, the fuel injection quantity in the initial stage of the main injection increases as compared with the case where low-pressure injection is performed in the initial stage of the main injection. Consequently, the fuel quantity to be injected in the remaining period of the main injection decreases by the quantity corresponding to the increase in the injection quantity in the initial stage, and hence the period of the entire main injection is shortened. By injecting the appropriate quantity of fuel in the initial stage of the main injection to shorten the main injection period in this way, the fuel injection ends early and therefore the fuel economy is improved. In addition, unlike the case where high-pressure injection is started from the initial stage of the main injection, excessive fuel supply before ignition is prevented, resulting in reduction in engine noise and NOx emission.

Furthermore, by conducting the auxiliary injection at a low pressure, the required accuracy of auxiliary-injection time control is alleviated as compared to the case where the auxiliary injection is performed at a high pressure, so that the fuel injection quantity in the auxiliary injection may be more accurately controlled to the required minimum, contributing to improvement in fuel economy.

The fuel control means may be so configured, for instance, as to control opening/closing timings of valves for fuel injection timing control and for injection rate switching. This eliminates the need of utilizing a particularly complicated arrangement.

FIGS. 1 to 3 schematically show the states of fuel spray formed by the auxiliary injection, the initial stage of the main injection, and the subsequent main injection, respectively, based on results of a combustion observation experiment the present inventors conducted. In the experiment, observations were made from above a cylinder on fuel spray formed by the fuel injected from a fuel injection nozzle with four nozzle holes. In the illustrations, a small circle represents the fuel injection nozzle, and a large half circle represents half of the cylinder.

In the present invention, low-pressure auxiliary injection is performed prior to main injection, as described above. The auxiliary injection is made in a condition that a piston is on the lower side in the cylinder so that the density of gas in the cylinder is low. This allows fuel spray to easily diffuse outward in the radial direction of the cylinder, however, the diffusion of the fuel spray is restrained appropriately since the auxiliary-injection pressure is low. As shown in FIG. 1, the fuel spray is distributed in an area from the vicinity of the fuel injection nozzle to a radially intermediate part of the cylinder.

As described above, some conventional accumulator fuel-injection apparatuses are designed to inject fuel in the initial stage of main injection at a low pressure equivalent to auxiliary-injection pressure. With this arrangement, since the area to which fuel spray can reach (i.e., fuel spray distribution) overlaps the fuel spray distribution caused by the auxiliary injection, too much fuel may exist in that area. This causes a fear that the area is not supplied with sufficient air required for simultaneous or successive combustion of the fuel sprays formed by the auxiliary injection and the low-pressure main injection. In particular, the air for combustion of the fuel spray associated with the low-pressure main injection is consumed during the combustion of the fuel spray produced by the auxiliary injection, causing shortage of air, if the fuel spray produced by the auxiliary injection is caused to ignite, just before or after the start of the main injection, with the increase in pressure and temperature in the cylinder due to upward piston movement. At any rate, when fuel is injected at a low pressure in the initial stage of the main injection, the fuel spray and flames caused by the auxiliary injection hinder the diffusion of the fuel spray formed by the low-pressure main injection and hinder the supply of fresh air required for combustion of the fuel spray, preventing a proper combustion of the fuel spray. Thus, black smoke is liable to be discharged from the engine.

In contrast, according to the present invention, the main injection is started in a condition that a fuel pressure higher than the auxiliary-injection pressure is established in the fuel passage on the downstream-side of the control valve, as described above. Since the fuel injection pressure in the initial stage of the main injection is higher than the auxiliary-injection pressure, the fuel spray reaches, as shown in FIG. 2, an area outwardly of the fuel spray and flames formed by the auxiliary injection as viewed in the radial direction of the cylinder. Sufficient air remaining in the outer area permits a proper combustion of the fuel spray. While the fuel injected at an intermediate pressure is scattered to penetrate through the fuel spray and flames formed by the auxiliary injection as described above, surrounding air is involved in the fuel spray, so that the volume of the entire fuel spray increases. This means that the fuel spray diffuses satisfactorily in the cylinder to provide an appropriate fuel spray distribution in the cylinder.

Under such a condition, the fuel injection pressure is changed from intermediate pressure to high pressure. The high-pressure fuel spray properly diffuses in the cylinder as indicated in black in FIG. 3, while increasing, its volume by sucking surrounding air and combustion residues such as soot produced by the auxiliary injection and the intermediate-pressure main injection. Since the diffusing high-pressure fuel spray activates the combustion in the cylinder, the entire fuel spray burns satisfactorily, preventing the production of black smoke. Referring to FIG. 3, the distribution area of the high-pressure fuel spray is dislocated from that of the intermediate pressure fuel spay in the circumferential direction of the cylinder. Presumably, this is caused by a swirl formed in the cylinder.

As described above, according to the present invention, the intermediate-pressure main injection and the high-pressure main injection are performed successively in a condition that the diffusion of fuel spray formed in the cylinder by low-pressure auxiliary injection is restrained appropriately, so as to realize a proper combustion of the fuel spray. This makes it possible to improve the fuel economy and exhaust-gas characteristic of the engine and reduce the engine noise.

In the present invention, desirably, the intermediate pressure formed in the fuel passage on the downstream-side of the control valve in the initial stage of the main injection by the fuel control means has a value closer to the pressure of the low-pressure fuel in the second accumulator in a lower-speed, lower-load engine operating region, and closer to the pressure of the high-pressure fuel in the first accumulator in a higher-speed, higher-load engine operating region.

Generally, the distance for which the injected fuel flies is longer in a lower-speed, lower-load operating region where the in-cylinder pressure is low, whereas the injected fuel flies over a smaller distance in a higher-speed, higher-load operating region where the in-cylinder pressure is high. In the preferred arrangement, the injection pressure of the intermediate-pressure main injection is varied depending on the engine operating state. Thus, the pressure of injected fuel, the distance for which the fuel flies, and the diffusion state of fuel spray in the initial stage of the main injection are suited to the engine operating state.

Desirably, the fuel control means controls the pressure of the high-pressure fuel in the first accumulator and the pressure of the low-pressure fuel in the second accumulator, based on the operating state of the engine, for example, the speed and load of the engine. In this case, the intermediate pressure formed in the fuel passage on the downstream-side of the control valve in the initial stage of the main injection is suited to the engine operating state.

Desirably, the fuel control means variably controls the period of time for which the control valve is opened between the auxiliary injection and the main injection. The control-valve opening time period determines the intermediate pressure formed in the fuel passage on the downstream-side of the control valve in the initial stage of the main injection. Thus, the intermediate pressure can be varied accurately and easily by the variable control of the control-valve opening period.

BEST MODE OF CARRYING OUT THE INVENTION

An accumulator fuel-injection apparatus according to an embodiment of the present invention will be described below.

Figure 4:
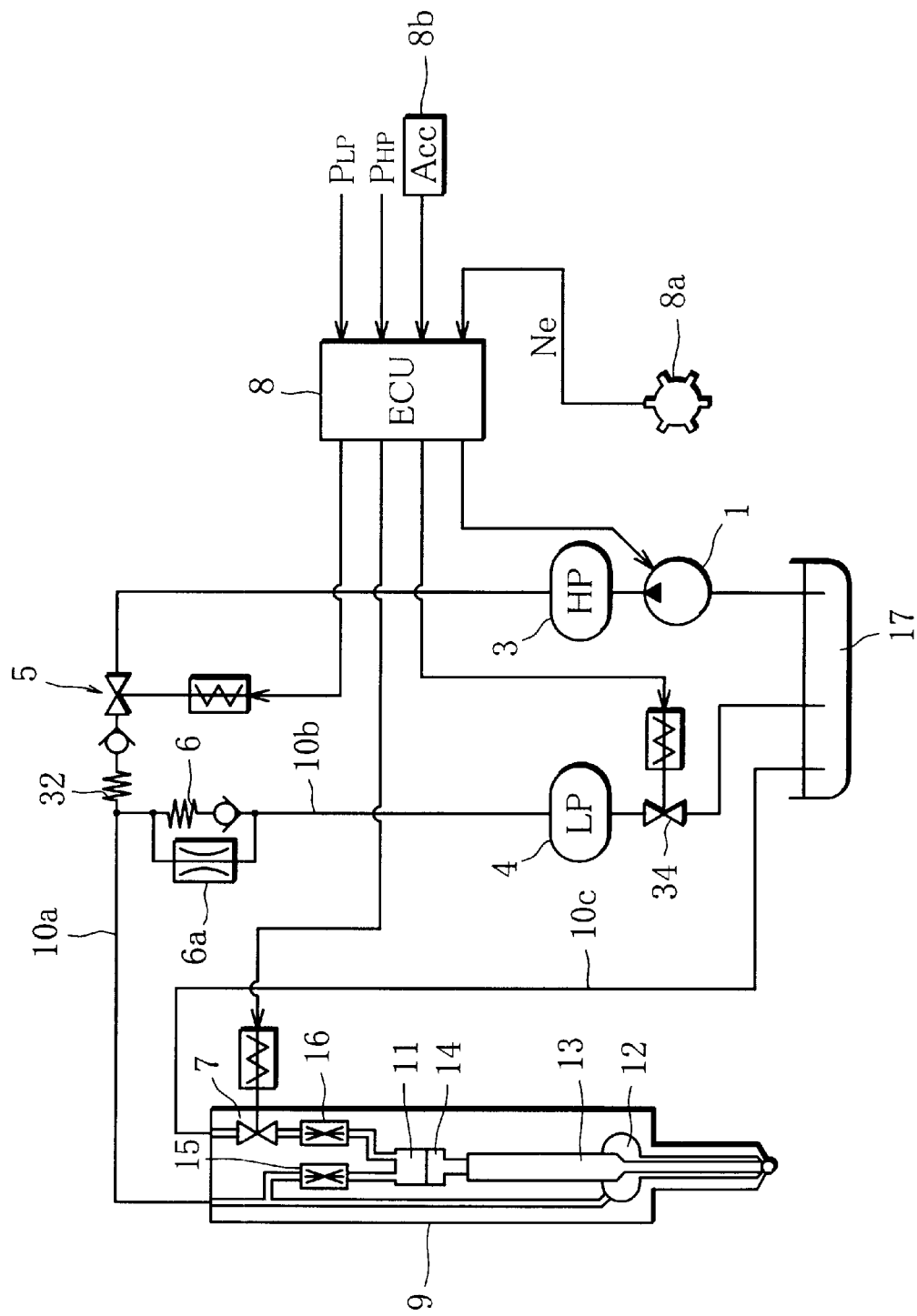
FIG. 4 is a diagram showing an accumulator fuel-injection apparatus according to an embodiment of the present invention.
Figure 5:
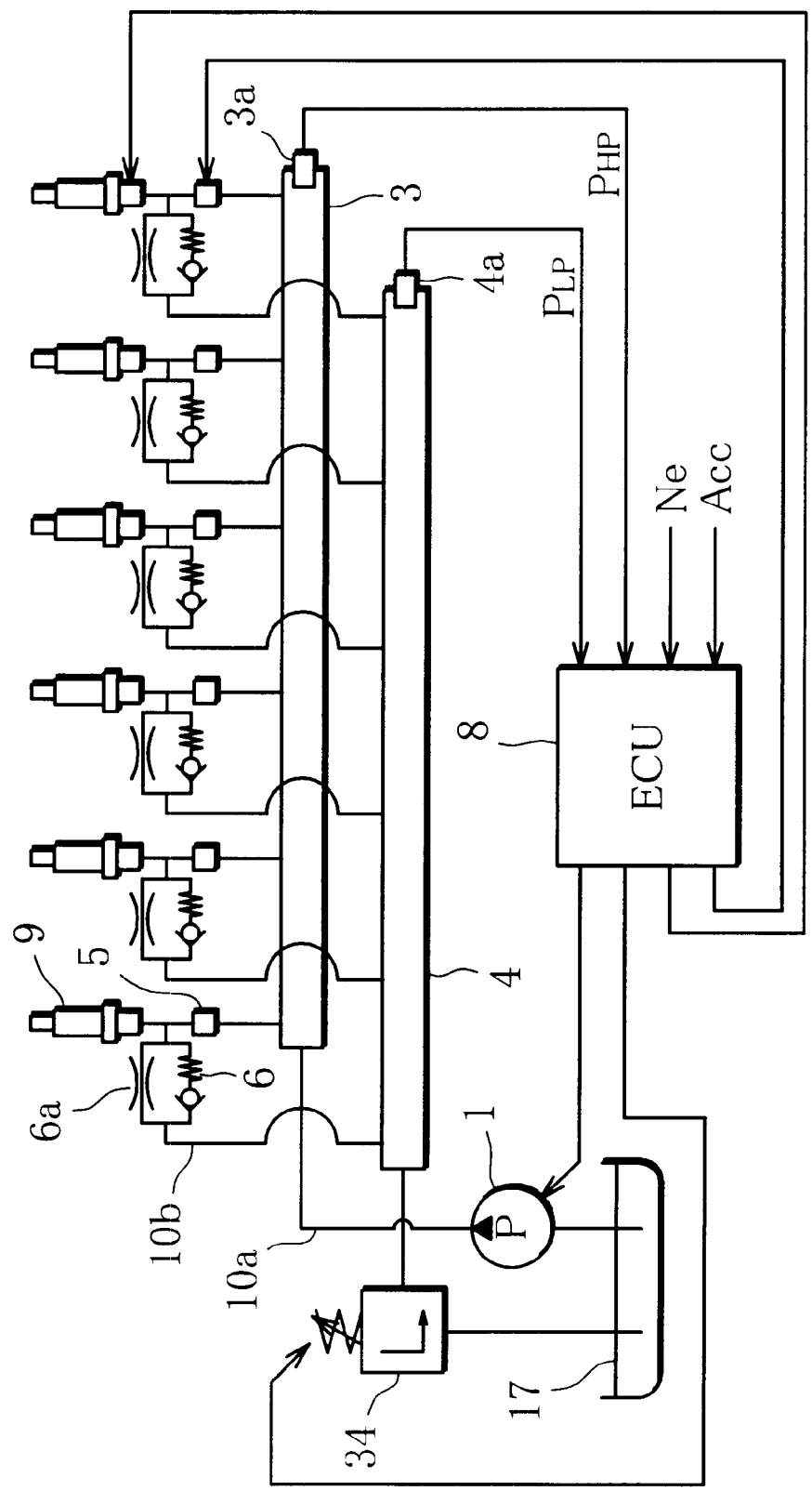
FIG. 5 is a diagram showing connection between main elements of the fuel-injection apparatus shown in FIG. 4 and respective injectors of cylinders of an engine.

The accumulator fuel-injection apparatus is incorporated in, for example, an in-line six-cylinder diesel engine (not shown), and includes a high-pressure pump 1 as shown in FIGS. 4 and 5. The high-pressure pump 1 is driven by the engine to draw fuel from a fuel tank 17 and pressurize it. The high-pressure pump 1 is, for example, a positive-displacement plunger pump whose fuel discharge pressure can be regulated by regulating an effective length of force-feed stroke. The force-feed stroke is regulated, for example, by adjusting the timing of closing a solenoid valve (not shown). While the solenoid valve is open,! pressure-feed actions are rendered ineffective. The high-pressure pump 1 of the apparatus of the present embodiment adapted for a six-cylinder engine has, for example, two plungers. Each plunger is associated with three cylinders and makes three force-feed strokes during one rotation of a high-pressure pump shaft.

Figure 2:
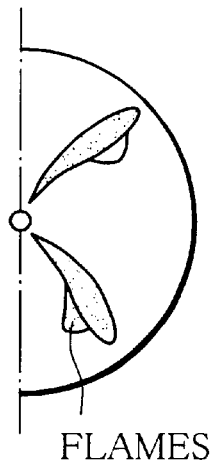
FIG. 2 is a schematic illustration showing the state of fuel spray at the time of intermediate-pressure main injection.

A controller (ECU) 8 of the accumulator fuel-injection apparatus variably regulates the force-feed stroke of the pump 1 based on engine speed Ne and accelerator-pedal depression (an accelerator opening degree) ACC detected by an engine speed sensor 8a and an accelerator opening-degree sensor 8b, respectively, and feedback-controls the force-feed stroke (fuel pressure) based on actual pressure $P_{HP}$ in a high-pressure accumulator (first accumulator) 3 detected by a pressure sensor 3a (FIG. 2), to thereby obtain a high-pressure fuel suited to engine operating state.

The fuel pressurized by the pump 1 is stored in the high-pressure accumulator 3. The high-pressure accumulator 3 is provided in common for all the cylinders and connected with fuel passages 10a. The fuel passages 10a are each provided with a selector valve (control valves) 5, such as for example two-way solenoid valve, for switching the fuel injection rate. A check valve 32 is also provided in the fuel passage 10a on the side immediately downstream of the selector valve 5.

The fuel passage 10a is connected with a low-pressure accumulator (second accumulator) 4, provided for all the cylinders, through a fuel passage 10b branched from the fuel passage 10a on the downstream side of the check valve 32. A check valve 6 arranged in the fuel passage 10b is designed to open when the fuel pressure in the fuel passage 10b on the side close to the low-pressure accumulator 4 is higher than the fuel pressure in the fuel passage 10a on the downstream side of the check valve 32. The fuel passage 10b is formed with a bypass fuel passage bypassing the check valve 6 and having an orifice 6a. When the fuel pressure in the fuel passage 10a is higher than the fuel pressure in the fuel passage 10b, the fuel in the fuel passage 10a flows into the fuel passage 10b through the orifice 6a, and then flows into the low-pressure accumulator 4. Between the low-pressure accumulator 4 and the fuel tank 17 is arranged a pressure control solenoid valve 34 (FIG. 4) for controlling the fuel pressure in the low-pressure accumulator 4 to a predetermined pressure.

In place of the pressure control valve 34 shown in FIG. 4, a pressure control valve 34 (FIG. 5) may be used which regulates, under the control of the controller 8, the fuel pressure in the low-pressure accumulator 4 to a predetermined pressure. In the following, the fuel injection apparatus with the pressure control valve 34 shown in FIG. 5 will be described. In FIG. 5, reference numeral 4a denotes a pressure sensor for detecting a fuel pressure $P_{LP}$ in the low-pressure accumulator 4.

The controller 8 controls the pressure control valve 34 based on an actual fuel pressure $P_{LP}$ detected by the fuel sensor 4a (FIG. 5) so as to establish the fuel pressure in the low-pressure accumulator 4 suited to engine operating state represented by engine speed Ne and accelerator pedal depression ACC.

Each of injectors (fuel injection nozzles) 9 provided for every cylinder of the engine has a control chamber 11 and a fuel chamber 12 that are connected with the fuel passage 10a. The control chamber 11 is connected with the fuel tank 17 through a fuel return passage 10c. Reference numerals 15, 16 denote orifices. Reference numeral 7 denotes an on-off valve arranged in the fuel return passage 10c, such as for example a two-way solenoid valve, for controlling the fuel injection timing. The on-off valve 7 may be incorporated in the injector.

The injector 9 has a needle valve 13 that is movable, under the fuel pressure supplied to the fuel chamber 12, in the direction to open a nozzle hole, a hydraulic piston 14 movable in the direction to close the nozzle hole under the fuel pressure supplied to the control chamber 11, and a spring (not shown) urging the needle valve in the direction to close the nozzle hole.

When the control chamber 11 and the fuel chamber 12 are supplied with fuel of the same pressure from the fuel passage 10a and the on-off valve 7 for fuel-injection timing control is closed, the sum of the forces produced by the fuel pressure and the spring and acting on the hydraulic piston 14 is larger than the force produced by the fuel pressure and acting on the needle valve 13, and hence the needle valve 13 closes the nozzle hole. On the other hand, when the on-off valve 7 is open so that the fuel in the control chamber 11 is discharged to the tank 17, the force acting on the hydraulic piston 14 reduces or disappears, and hence the needle valve 13 pushes the hydraulic piston 14 upward to open the nozzle hole, so that the fuel in the fuel chamber 12 is injected into a combustion chamber (not shown) of the engine.

The accumulator fuel-injection apparatus of the present embodiment, configured to carry out main injection and auxiliary injection preceding the main fuel injection, mainly contemplates shortening the main injection time period without excessively increasing the injection pressure in the initial stage of main injection, particularly the injection pressure before ignition, and also contemplates supplying, by the auxiliary injection, the minimum quantity of fuel required to prevent an ignition delay of fuel supplied by the main injection, thereby simultaneously achieving improved fuel economy, reduced engine noise, and reduced NOx emission.

Figure 6:
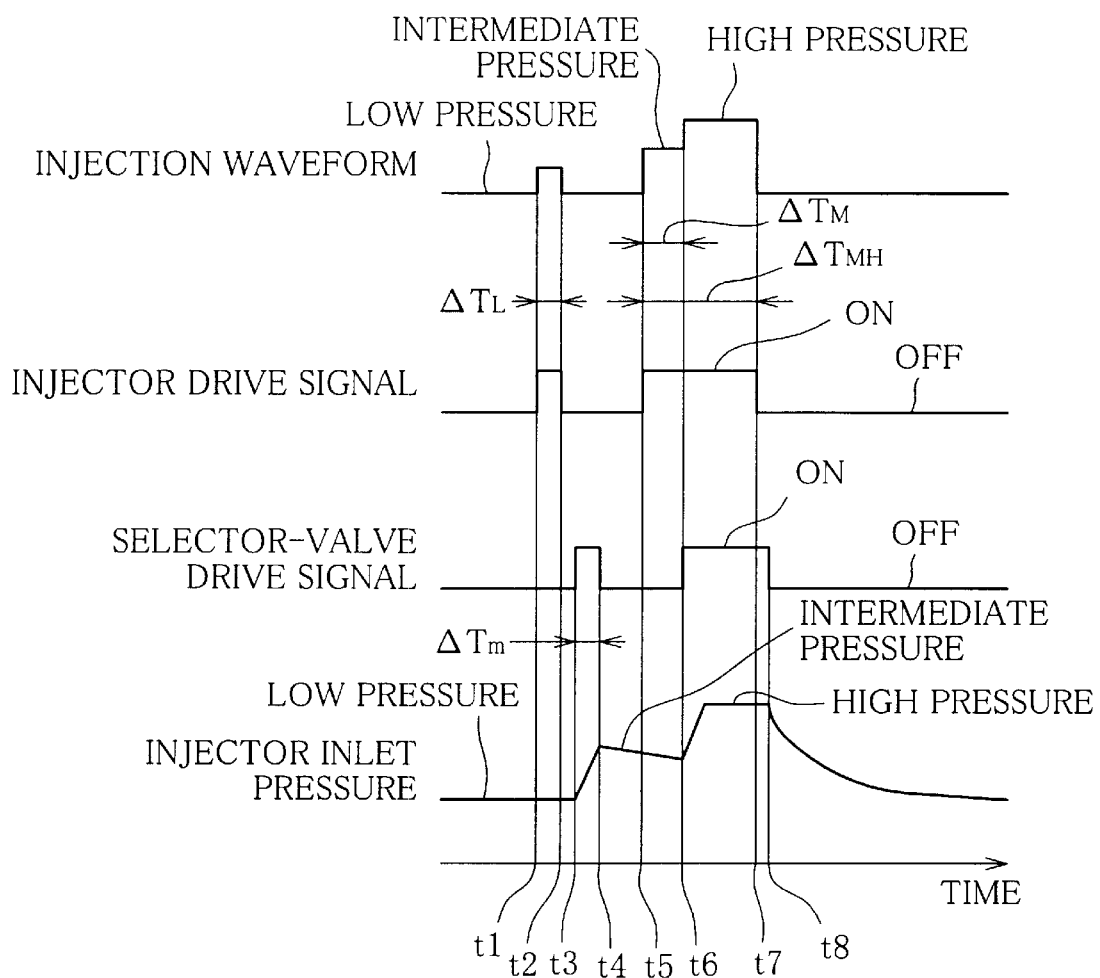
FIG. 6 is a diagram showing injection waveform for one fuel-injection cycle performed by the fuel injection apparatus shown in FIGS. 4 and 5, along with changes with elapse of time in on/off states of an injector drive signal and a selector-valve drive signal and in injector inlet pressure.

Specifically, as shown in the uppermost part of FIG. 6, in each fuel injection cycle, the fuel injection apparatus starts the main injection at an intermediate pressure when a predetermined period of time has elapsed after completion of auxiliary injection at a low pressure, and switches the injection pressure from the intermediate pressure to high pressure during the main injection.

As for the fuel injection control, the controller 8 determines an engine operating state based on, for example, engine speed Ne and accelerator pedal depression Acc. Based on the determined engine operating state, the controller 8 controls the timing of opening/closing a solenoid valve (not shown) for force-feed stroke adjustment, so as to regulate the force-feed stroke of high-pressure pump 1, thereby establishing a fuel pressure in the high-pressure accumulator 3 suited to engine operating state. The controller 8 also controls the operation of the pressure control valve 34 based on the engine operating state, to thereby control the fuel pressure in the low-pressure accumulator 4 so as to be suited to the engine operating state. Furthermore, the controller 8 determines the values of injection control parameters based on the engine operating state, for example, by referring to maps. As shown in FIG. 6, the injection control parameters include, for example, auxiliary injection start timing t1, auxiliary injection period $\Delta TL$ (=t2−t1), high-pressure fuel feed start timing t3 to form the intermediate pressure, high-pressure fuel feed period $\Delta Tm$ (=t4−t3), main injection start timing t5, intermediate pressure injection period $\Delta TM$ (=t6−t5), and main injection period $\Delta TMH$ (=t7−t6). Based on the injection control parameter values, the controller 8 further determines injector drive signal turning-on timings t1, t5, injector drive signal turning-off timings t2, t7, selector-valve drive signal turning-on timings t3, t6, and selector-valve drive signal turning-off timings t4, t8.

Next, the operation of the fuel injection apparatus having the above-described structure will be described.

Figure 7:
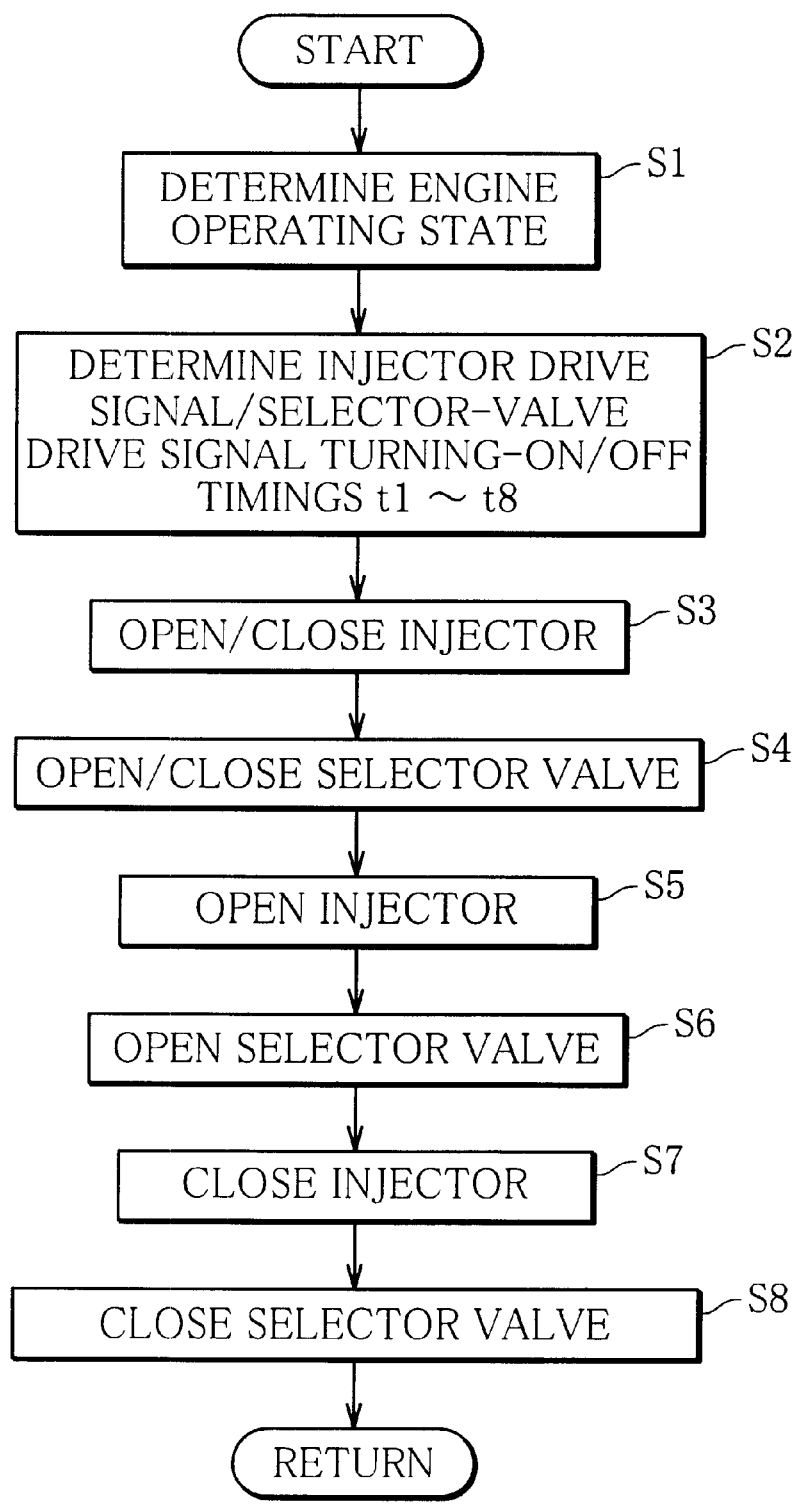
FIG. 7 is a flowchart showing an injector/selector-valve control routine executed by a controller shown in FIGS. 4 and 5.

During the engine operation, the controller 8 executes fuel pressure control routine (not shown) and injector/selector-valve control routine shown in FIG. 7 in parallel and periodically. Both the control routines start each time the time point to start the fuel injection cycle for each cylinder is reached, which point is recognized, for example, based on the elapsed time after a cylinder discrimination signal or a crank shaft rotational position signal (not shown) rise.

For convenience of illustration and explanation, the control routine shown in FIG. 7 includes only a control procedure for one cylinder. Part of the control procedure, for example, the determination of engine operating state may be performed for all the cylinders only once in one fuel-injection cycle.

In the fuel pressure control routine, the solenoid valve for force-feed stroke adjustment and the pressure control valve are controlled in their opening/closing timing and valve opening degree, based on the determined engine operating state, so that respective fuel pressures in the accumulators 3, 4 may become their respective target pressures suited to engine operating state. In the fuel pressure control routine of the present embodiment, the ECU 8 reads, as engine operating-state parameters, an engine speed Ne detected by the engine speed sensor 8a and an accelerator opening degree ACC detected by the accelerator opening-degree sensor 8b and representing engine load, and determines target high- and low-pressure fuel pressures corresponding to the detected engine speed Ne and accelerator opening degree ACC, by referring to HP and LP maps shown in FIG. 9, respectively.

Figure 9:
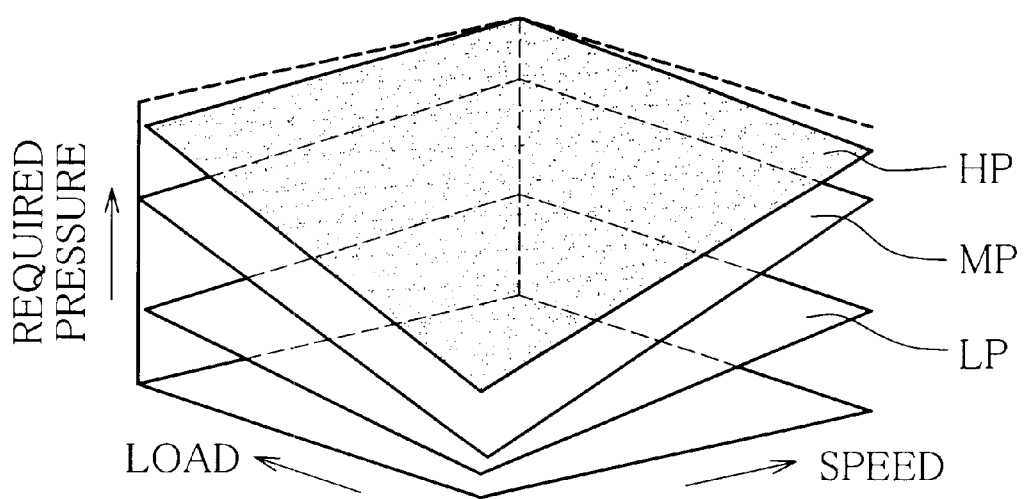
FIG. 9 is a diagram showing maps for low-pressure auxiliary injection, intermediate-pressure main injection and high-pressure main injection for use in determining required pressures that varies depending on engine speed and engine load.

As shown in FIG. 9, the target low-pressure fuel pressure in the LP map increases with the increase in engine speed and with the increase in engine load. The target high-pressure fuel pressure in the HP map is higher than the target low-pressure fuel pressure in the LP map at the same engine speed and engine load.

The target high-pressure fuel pressure increases with the increase in engine speed and engine load at higher increase rates than the rate at which the target low-pressure fuel pressure increases as the engine speed and engine load increase. Generally, the LP and HP maps are in the form of curved surfaces in a three-dimensional coordinate system as shown in FIG. 9.

In general, the appropriate fuel injection quantities in the auxiliary injection and the main injection vary depending not only on the main engine-operating-state parameters such as engine speed and engine load (accelerator opening degree) but also on other engine-operating-state parameters such as engine cooling water temperature, fuel temperature, intake air temperature and EGR quantity. Desirably, the LP and HP maps used to determine the target fuel pressure affecting the fuel injection quantity are determined taking at least some of the above-mentioned other engine-operating-state parameters into consideration. For example, it is relatively easy to prepare the LP and HP maps considering the EGR quantity (EGR-quantity corrected maps), because the EGR quantity varies depending on engine operating region (engine speed and load). As for the temperature parameters, the LP and HP maps for every temperature region may be prepared, for instance. Alternatively, EGR-quantity correction and various temperature corrections may be made to the target fuel pressures determined from the LP and HP maps.

After determining the target fuel pressures, the ECU 8 regulates the timing of closing the solenoid valve for force-feed stroke adjustment, so that the actual pressure $P_{HP}$ in the high-pressure accumulator 3 detected by the pressure sensor 3a may coincide with the target high-pressure fuel pressure, and regulates the timing of opening/closing the pressure control valve 34 and the valve opening degree thereof, so that the actual pressure $P_{LP}$ in the low-pressure accumulator 4 detected by the pressure sensor 4a may coincide with the target low-pressure fuel pressure.

The injector/selector-valve control routine shown in FIG. 7 is started each time the time point to start fuel injection cycle is reached. At this time, a timer (not shown) provided in, e.g., the controller 8 is started to measure the time elapsed from the start of fuel injection cycle.

In the control routine in FIG. 7, an engine speed Ne and accelerator pedal depression ACC are read to determine an engine operating state (step S1). Then, respective values of the auxiliary injection start timing t1, auxiliary injection period ΔTL, high-pressure fuel feed start timing t3, high-pressure fuel feed period ΔTm, main injection start timing t5, intermediate pressure injection period ΔTM, and main injection period ΔTMH are determined based on the engine operating state determined in step S1, by referring to maps. Based on these fuel injection control parameter values, the injector drive signal/selector-valve drive signal turning-on/off timings t1 to t8 are determined (step S2).

In the present embodiment, in order to determine the intermediate pressure forming high-pressure fuel feed period ΔTm, the ECU 8 determines a target main-injection initial pressure (required fuel pressure) suited to engine speed Ne and accelerator opening degree ACC, by referring to an MP map shown in FIG. 9. Next, the ECU 8 determines a high-pressure fuel feed period ΔTm corresponding to the required fuel pressure, from a ΔTm map shown in FIG. 10.

As shown in FIG. 9, the target main-injection initial pressure (target intermediate-pressure fuel pressure) in the MP map is higher than the target low-pressure fuel pressure in the LP map and lower than the target high-pressure fuel pressure in the HP map, at the same engine speed and the same engine load. The target main-injection initial pressure increases with the increase in engine speed and engine load at higher increase rates than the rates at which the target low- and high-pressure fuel pressures increase with the increase in engine speed and engine load. In the MP map in FIG. 9, the target main-injection initial pressure has a value closer to the target low-pressure fuel pressure in a lower-speed, lower-load engine operating region, and closer to the target high-pressure fuel pressure in a higher-speed, higher-load engine operating region. This way of target pressure value setting is in conformity with the fact that in a lower-speed lower-load region, the boost pressure and the in-cylinder gas density are lower and the distance for which the injected fuel flies is larger, whereas in a higher-speed higher-load region, the boost pressure and the in-cylinder gas density are higher and the injected fuel flying distance is smaller. As a consequence, a proper fuel spray distribution is formed in the cylinder, contributing to proper combustion. Generally, the MP map is in the form of a curved surface in a three-dimensional coordinate system shown in FIG. 9. As in the case of the LP and HP maps, the MP map is prepared taking the influences of EGR quantity and various temperature parameters into consideration, or alternatively, various corrections are made to the target pressure obtained from the MP map.

Figure 10:
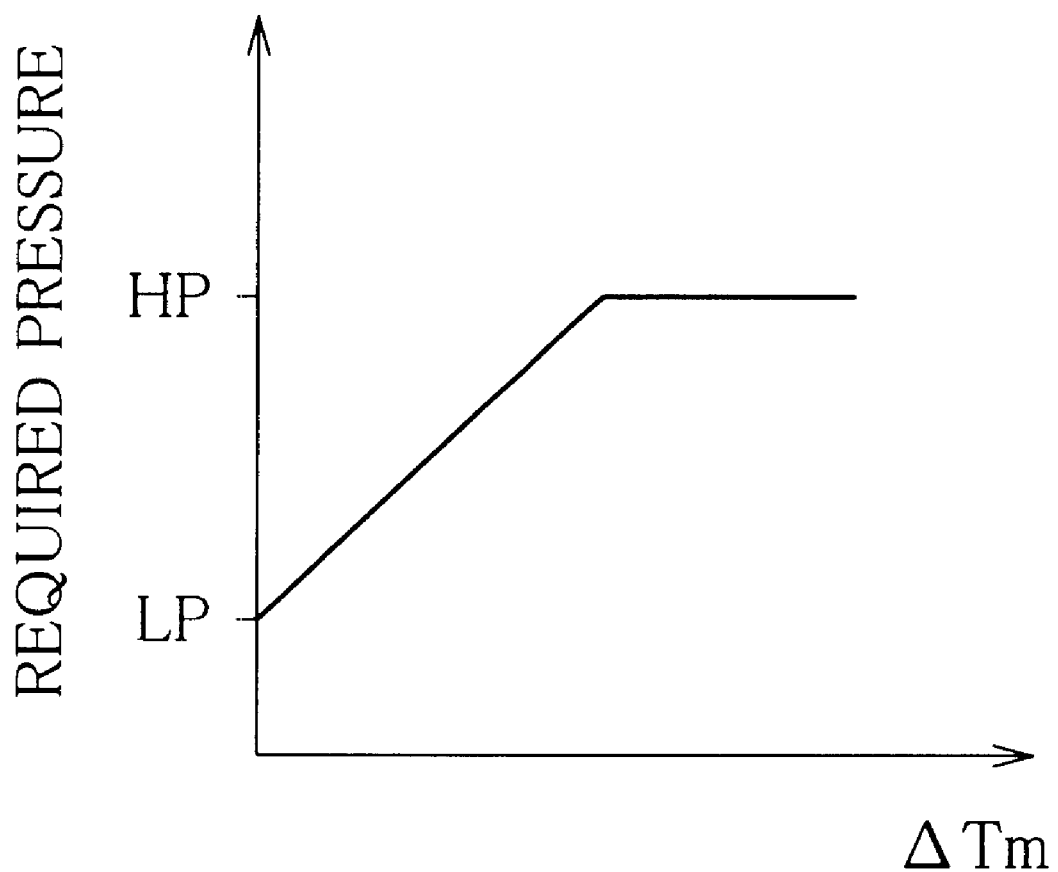
FIG. 10 is a graph showing a relationship between required pressure in intermediate-pressure main injection and high-pressure fuel feed period AT for establishing intermediate pressure.

In FIG. 10, symbols HP and LP denote target high- and low-pressure fuel pressures observed when the high-pressure fuel feed period ΔTm is determined, which pressures vary depending on engine speed and accelerator opening degree at that time. The relation between high-pressure fuel feed period ΔTm and intermediate pressure formed by feeding the high-pressure fuel over that period is determined by specifications, such as the volume of pipes, including the fuel passage 10a, in the accumulator fuel-injection apparatus and the flow rate of high-pressure fuel in a state that the selector valve 5 is open. In other words, the high-pressure fuel feed period ΔTm for obtaining the required intermediate pressure can be obtained experimentally.

Referring to FIG. 7 again, after the determination of the injector drive signal/selector-valve drive signal turning-on/off timings t1 to t8 in step S2 of the control routine, a determination is made as to whether or not the auxiliary injection start timing t1 is reached based on the time elapsed from the start of fuel injection cycle. As shown in FIG. 6, both the selector valve 5 and the on-off valve 7 are closed until the auxiliary injection start timing t1 is reached, so that low-pressure fuel is supplied from the low-pressure accumulator 4 to the fuel passage 10a on the downstream side of the selector valve 5, to be supplied to the control chamber 11 and the fuel chamber 12. Since the on-off valve 7 is closed, the sum of the force by the fuel pressure in the control chamber 11 acting on the hydraulic piston 14 and the force by the spring acting on the needle valve is larger than the force by the fuel pressure in the fuel chamber 12 acting on the needle valve 13. Therefore, the nozzle hole of the injector 9 is closed with the needle valve 13.

Here, the fuel pressure in the fuel chamber 12 (injector inlet pressure) is kept at a pressure that is substantially the same as the pressure of the low-pressure fuel in the low-pressure accumulator 4. Specifically, when the fuel pressure in the fuel passage 10a on the side downstream of the check valve 32 becomes lower than the pressure of the low-pressure fuel, the check valve 6 in the fuel passage 10b opens, so that the low-pressure fuel is supplied from the low-pressure accumulator 4 to the fuel passage 10a. On the other hand, when the fuel pressure in the fuel passage 10a on the downstream side of the check valve 32 becomes higher than the pressure of the low-pressure fuel, the fuel in the fuel passage 10a flows through the orifice 6a into the low-pressure accumulator 4.

When the auxiliary injection start timing t1 is reached, the injector drive signal is turned on and only the on-off valve 7 is opened (step S3). Thus, the low-pressure fuel in the control chamber 11 is drained through the orifice 16 to the fuel return passage 10c. At the time when the sum of the force acting on the hydraulic piston 14 and the force by the spring acting on the needle valve becomes smaller than the force acting on the needle valve 13, the needle valve 13 moves up to open the nozzle hole, so that the low-pressure fuel is injected from the injector 9. Thus, the auxiliary injection starts at a relatively low injection pressure, or at a relatively low fuel injection rate (fuel injection quantity per unit time).

Thereafter, when the auxiliary injection period ΔTL has elapsed from the auxiliary injection start timing t1 so that the auxiliary injection end timing t2 is reached, the injector drive signal is turned off and the on-off valve 7 is closed (step S3), whereby the nozzle hole is closed with the needle valve 13. Thus, the auxiliary injection at a low pressure ends.

Figure 1:
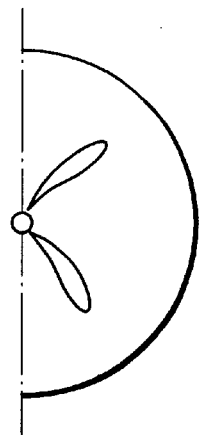
FIG. 1 is a schematic illustration showing, in respect of half of a cylinder, the state of fuel spray at the time of auxiliary injection.

The fuel thus injected into the combustion chamber of the engine does not necessarily burn at once. However it becomes chemically activated, which facilitates ignition of fuel subsequently supplied to the engine by the main injection, or in. other words, decreases ignition delay. The auxiliary injection period ΔTL is determined to supply the minimum quantity of fuel required to prevent the ignition delay, in order to improve fuel economy. As already described based on FIG. 1, the fuel spray formed by the low-pressure auxiliary injection is distributed in an area from the vicinity of the fuel injection nozzle to a radially intermediate part of the cylinder. With such a fuel spray distribution, flames spread properly in the cylinder. Specifically, ignition of fuel starts on the radially inner side of the cylinder, and flames spread outward from the inner area to the entire area in the cylinder.

When the auxiliary injection is performed at a low pressure as described above, the required accuracy of auxiliary-injection time control is alleviated than when the auxiliary injection is performed at a high pressure. This allows the fuel injection quantity in the auxiliary injection to be more accurately controlled to the required minimum, thereby contributing to improvement in fuel economy.

Next, in order to fill the fuel chamber 12 of the injector 9 and the downstream section of the fuel passage 10a with intermediate pressure fuel for intermediate-pressure injection in the initial stage of the main injection, high pressure fuel for forming the intermediate pressure is fed from the high-pressure accumulator 3 to the downstream section of the fuel passage 10a.

Specifically, when the high-pressure fuel feed start timing t3 determined in step S2 is reached, the selector-valve drive signal is turned on. Consequently, the selector valve 5 for injection rate switching is opened (step S4), so that the high-pressure fuel from the high-pressure accumulator 3 opens the check valve 32, flows into the downstream section of the fuel passage 10a, and then flows into the control chamber 11 and the fuel chamber 12 of the injector 9. As a result, as shown in the lowest part of FIG. 6, the injector inlet pressure increases from the injection pressure in the auxiliary injection (low pressure).

When the high-pressure fuel feed period ΔTm has elapsed from the fuel-pressure feed start timing t3 so that the high-pressure fuel feed end timing t4 is reached, the selector-valve drive signal is turned off, with the judgement that the intermediate pressure has been formed in the fuel chamber 12 and in the downstream section of the fuel passage 10a, and the selector valve 5 is closed (step S4). Thus, the supply of high-pressure fuel for forming the intermediate pressure ends.

Part of the intermediate pressure fuel in the fuel chamber 12 and the downstream section of the fuel passage 10a gradually flows into the low-pressure accumulator 4 through the orifice 6a. Therefore, as shown in FIG. 6, the injector inlet pressure gradually decreases a little. Although it is not clear in FIG. 6, the injector inlet pressure decreases more steeply than before when the injector drive signal is turned on at the time point of t5 to open the on-off valve 7.

When the main injection start timing t5 is reached, the injector drive signal is turned on to open the on-off valve 7 for injection timing control (step S5). Hence, the nozzle hole of the injector 9 is caused to open, and the intermediate pressure fuel in the fuel chamber 12 is injected into the combustion chamber of the engine. Since the main injection fuel is supplied in the presence of fuel supplied by the auxiliary injection and activated until that time, the main injection fuel ignites immediately. Typically, the main injection fuel ignites during the shift from intermediate pressure injection to high-pressure injection, or prior to or subsequent to the shift. As already described based on FIG. 2, the fuel spray formed by the intermediate-pressure main injection reaches an area radially outwardly of the fuel spray and flames formed by the low-pressure auxiliary injection, and properly burns consuming the air remaining in that area. According to the present embodiment, moreover, the injection pressure in the intermediate-pressure main injection is varied depending on the engine operating condition referring to the MP map, thereby establishing a proper combustion speed of main injection fuel in the initial combustion stage.

Figure 8:
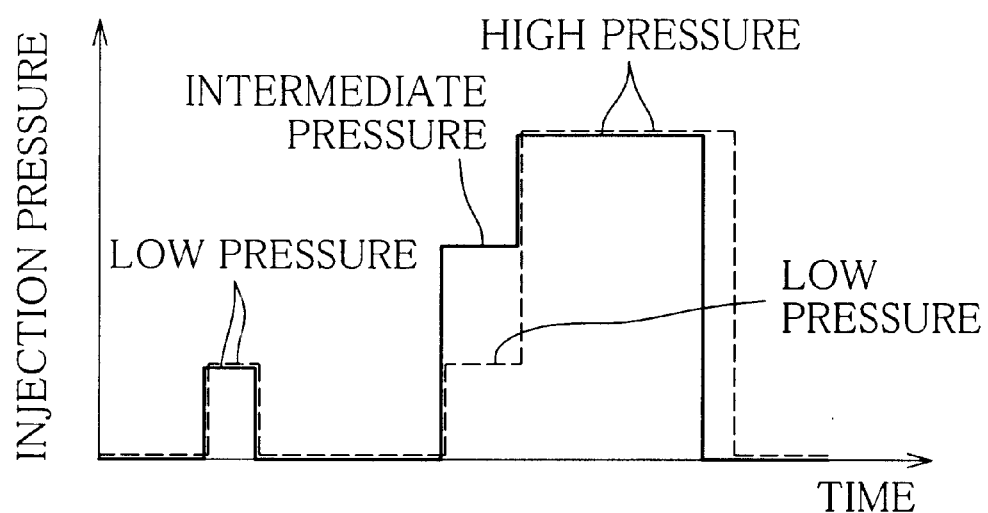
FIG. 8 is a diagram showing that the main-injection time decreasing effect attained by conducting the intermediate-pressure main injection and high-pressure main injection following low-pressure auxiliary injection.

By conducting the intermediate pressure injection in the initial stage of main injection following the low-pressure auxiliary injection as indicated by a solid line in FIGS. 6 and 8, the fuel injection quantity in the initial stage of main injection increases as compared with the case where the low-pressure injection is made in the initial stage of main injection (as indicated by a broken line in FIG. 8). Since the fuel quantity to be injected in the remaining period of main injection decreases by the quantity corresponding to the increase in injection quantity in the initial stage, the period of the entire main injection is shortened. Thus, the fuel injection ends early and fuel economy is improved. In addition, unlike the case where high-pressure injection is started immediately from the initial stage of main injection, excessive fuel is prevented from being supplied before ignition, thereby reducing the engine noise and NOx emission. Since the intermediate pressure injection can be made between auxiliary injection and main injection only by opening/closing the selector valve 5 for injection rate switching, the apparatus is not required to have a particularly complicated structure.

Figure 3:
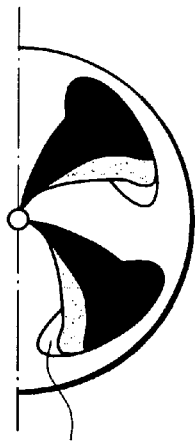
FIG. 3 is a schematic illustration showing the state of fuel spray at the time of high-pressure main injection.

When the intermediate pressure injection period ΔTM has elapsed from the main fuel start timing t5 so that the selector-valve drive signal turning-on timing t6 is reached, the selector valve 5 for injection rate switching is opened while the on-off valve 7 for injection timing control is open (step S6). Consequently, high-pressure fuel is supplied from the high-pressure accumulator 3 through the fuel passage 10a to the fuel chamber 12, to be injected from the injector 9 (FIGS. 6 and 8). Thus, the fuel injection (high-pressure main injection) is performed at a higher fuel injection rate than that for the intermediate pressure injection. As already described based on FIG. 3, the fuel injected by the high-pressure injection properly diffuses in the cylinder, involving surrounding air and fuel spray, especially, combustion residues such as soot, formed by the auxiliary injection and intermediate-pressure main injection, thereby activating combustion in the cylinder and contributing to proper combustion and reduction in black smoke.

When the main injection period ΔTMH has elapsed from the main injection start timing t5 so that the fuel injection end timing t7 is reached, the injector drive signal is turned off and the on-off valve 7 for injection timing control is closed (step S7). Consequently, the sum of the force by the high-pressure fuel in the control chamber 11 acting on the hydraulic piston 14 and the force by the spring acting on the needle valve becomes larger than the force by the fuel in the fuel chamber 12 acting on the needle valve 13. As a result, the nozzle hole is closed with the needle valve 13, and the main injection ends.

Meanwhile, with the orifice 16 configured to have a relatively large flow path cross-section, the fuel injection rate rapidly decreases at the fuel injection end timing t7, which contributes to reduction in black smoke and particulate matters discharged from the engine.

Then, the selector valve 5 for injection rate switching is closed at the time point of t8 at which a predetermined period of time has elapsed from the fuel injection end timing t7 (step S8). Alternatively, the selector valve 5 may be closed at the time point of t7.

On and after the time point of t8 where the selector valve 5 is closed, a considerable part of high-pressure fuel in the fuel passage 10a on the downstream side of the check valve 32 flows through the bypass fuel passage provided with the orifice 6a, into the low-pressure accumulator 4 where it is utilized for low-pressure fuel formation. The rest of the high-pressure fuel flows into the control chamber 11 or leaks out from around the control chamber 11 toward the fuel tank 17. Consequently, the fuel pressure in the downstream section of the fuel passage 10a and the injector inlet pressure decrease to the low pressure with elapse of time until the auxiliary fuel injection starts in the next fuel injection cycle, as shown in FIG. 6.

The present invention is not limited to the above embodiment and can be modified variously.

For example, in the embodiment, the intermediate-pressure injection is always performed in the initial stage of main injection that follows the low-pressure auxiliary injection in each fuel injection cycle, as indicated by a solid line in FIG. 8. However, it is not inevitably necessary to always perform the combination of low-pressure auxiliary injection, intermediate-pressure main injection and high-pressure main injection in each fuel injection cycle. Alternatively, it may be possible to selectively perform, depending on the engine operating state, combination of low-pressure auxiliary injection, intermediate-pressure main injection and high-pressure main injection as indicated by a solid line in FIG. 8, or combination of low-pressure auxiliary injection, low-pressure main injection and high-pressure main injection as indicated by a broken line in FIG. 8.

What is claimed is:

1. An accumulator fuel-injection apparatus, comprising:
    a first accumulator for storing high-pressure fuel pressurized by a pump;
    a fuel injection nozzle, connected with said first accumulator through a fuel passage, for injecting fuel into a combustion chamber of an engine;
    a control valve for controlling discharge of the high-pressure fuel in said first accumulator toward a downstream-side of the fuel passage;
    a second accumulator, connected with the fuel passage on a downstream-side of the control valve through a branch passage, for storing low-pressure fuel having a pressure lower than the pressure of the high-pressure fuel in said first accumulator; and
    fuel control means for opening said control valve for a short time between auxiliary short injection and main injection and for opening said control valve in the course of the main injection, while the auxiliary short injection and the main injection are carried out, in this order with an interval between through said fuel injection nozzle.

2. The accumulator fuel-injection apparatus according to claim 1, wherein said fuel control means establishes an intermediate pressure in the fuel passage on the downstream-side of said control valve in an initial stage of the main injection, said intermediate pressure being higher than a pressure of the low-pressure fuel in said second accumulator and lower than a pressure of the high-pressure fuel in said first accumulator.

3. The accumulator fuel-injection apparatus according to claim 2, wherein the intermediate pressure formed in the fuel passage on the downstream-side of said control valve in the initial stage of the main injection has a value closer to the pressure of the low-pressure fuel in said second accumulator in a lower-speed, lower-load engine operating region, and closer to the pressure of the high-pressure fuel in said first accumulator in a higher-speed, higher-load engine operating region.

\* \* \* \* \*